US012570173B2

(12) United States Patent
　　Ginsberg-Klemmt et al.

(10) Patent No.:　US 12,570,173 B2
(45) Date of Patent:　Mar. 10, 2026

(54) VEHICULAR ELECTRICITY GENERATING CANOPY APPLIANCE

(71) Applicants: Antonia Ginsberg-Klemmt, Sarasota, FL (US); Achim Ginsberg-Klemmt, Sarasota, FL (US)

(72) Inventors: Antonia Ginsberg-Klemmt, Sarasota, FL (US); Achim Ginsberg-Klemmt, Sarasota, FL (US)

( * ) Notice: Subject to any disclaimer, the term of this patent is extended or adjusted under 35 U.S.C. 154(b) by 29 days.

(21) Appl. No.: 18/750,705

(22) Filed: Jun. 21, 2024

(65) Prior Publication Data

US 2024/0343145 A1　　Oct. 17, 2024

Related U.S. Application Data

(63) Continuation-in-part of application No. 18/348,989, filed on Jul. 7, 2023, now Pat. No. 12,231,083, which is a continuation-in-part of application No. 17/981,065, filed on Nov. 4, 2022, now Pat. No. 12,040,737, which is a continuation-in-part of application No. 17/326,687, filed on May 21, 2021, now Pat. No. 11,515,833.

(60) Provisional application No. 63/359,722, filed on Jul. 8, 2022.

(51) Int. Cl.
　　*H02S 10/40*　　　(2014.01)
　　*B60L 53/51*　　　(2019.01)
　　*H02S 20/30*　　　(2014.01)
　　*H02S 30/10*　　　(2014.01)
　　*H02S 30/20*　　　(2014.01)

(52) U.S. Cl.
　　CPC .............. *B60L 53/51* (2019.02); *H02S 10/40* (2014.12); *H02S 20/30* (2014.12); *H02S 30/10* (2014.12); *H02S 30/20* (2014.12)

(58) Field of Classification Search
　　CPC .............. H02S 10/40; H02S 20/00–30; H02S 30/00–20; H02S 40/00–44
　　USPC ................................... 136/242–265
　　See application file for complete search history.

(56) References Cited

U.S. PATENT DOCUMENTS

| | | | | |
|---|---|---|---|---|
| 4,261,329 | A | * | 4/1981 | Walsh ..................... F24S 20/50 |
| | | | | 180/2.2 |
| 6,318,746 | B1 | | 11/2001 | McCrory |
| 10,378,235 | B1 | | 8/2019 | Volin |
| 2010/0154857 | A1 | * | 6/2010 | Tell .......................... H10F 19/80 |
| | | | | 136/244 |
| 2011/0025101 | A1 | | 2/2011 | Andretich |

(Continued)

FOREIGN PATENT DOCUMENTS

| | | | |
|---|---|---|---|
| CN | 219909876 U | * | 10/2023 |
| JP | 2022108371 A | * | 7/2022 |

OTHER PUBLICATIONS

JP-2022108371-A English (Year: 2022).*
CN-219909876-U English (Year: 2023).*

*Primary Examiner* — Bach T Dinh
(74) *Attorney, Agent, or Firm* — Donald R. Boys; Central Coast Patent Agengy LLC

(57) ABSTRACT

A vehicular electricity generating canopy appliance includes a rectangular framework forming a vehicular chassis with solar panels, support apparatus for repositioning panels, auxiliary wheels, a trailer dolly for towing, and an electrical system connected to an inverter supporting optional Vehicle to Grid (V2G) operations. The vehicular canopy is designed to be movable and storable to protect the panels during adverse weather conditions.

8 Claims, 26 Drawing Sheets

(56)          References Cited

U.S. PATENT DOCUMENTS

| | | |
|---|---|---|
| 2013/0233364 A1 | 9/2013 | Hotes |
| 2021/0061123 A1 | 3/2021 | Honda |
| 2023/0053934 A1* | 2/2023 | Ginsberg-Klemmt ...................... H02S 40/32 |
| 2023/0370017 A1 | 11/2023 | Ginsberg-Klemmt et al. |

* cited by examiner

*Fig. 22 (Section)*

Fig. 24 (Section)

VEHICULAR ELECTRICITY GENERATING CANOPY APPLIANCE

CROSS-REFERENCE TO RELATED APPLICATIONS

The instant application is a continuation-in-part (CIP) of application Ser. No. 18/348,989, filed 7 Jul. 2023, which claims priority to provisional patent application 63/359,722 filed 8 Jul. 2022, which is a CIP of application Ser. No. 17/981,065 filed 4 Nov. 2022, which is a CIP of Ser. No. 17/326,687 filed 21 May 2021 now issued as U.S. Pat. No. 11,515,833 on 29 Nov. 2022. All disclosure of the parent applications is incorporated at least by reference.

ACKNOWLEDGMENT OF GOVERNMENT SUPPORT

This invention was amde with Government support under DE-SC0022708 awarded by the U.S. Department of Energy. The government has certain rights in the invention.

BACKGROUND OF THE INVENTION

1. Field of the Invention

The present invention is in the technical area of solar power generation and pertains more particularly to a system configured as a vehicular canopy.

2. Description of Related Art

Solar systems are notoriously well known in the art and comprise generally a plurality of solar panels that convert sunlight to electrical energy, the solar panels mounted to a fixed structure and connected an electrical apparatus termed an inverter that converts the DC voltage produced by the solar panels to a common voltage useful in a public or private electrical AC grid. In the United States a common voltage for conversion may be 240 volts AC, which is the finally stepped down voltage provided to most homes and businesses from the public grid.

A quite common circumstance involves solar panels mounted on fixed carrier apparatus on the roof of a home or business. This is a common pattern when dealing with a single home or business. In other circumstances solar panels may be mounted and connected in what might be termed a solar farm, where a large area of solar panels may be located on the ground in a rural area, for example, and the electrical output may be provided directly into a public grid, or to a private grid supplying a number of homes or businesses.

It is most common in the art that mounted solar panels are more or less permanently mounted, and not readily moved, such as known for solar panels in a roof installation. Therefore, such panels and the apparatus to which they mount are subject to radical weather events. Exposed panels may be severely damaged, for example, by hurricanes, hailstorms, wind driven debris, tornadoes, falling trees and branches in windstorms, and by a variety of other damaging circumstances.

Given the above discussion the inventors believe that what is clearly needed are movable or portable structures to which solar panels are mounted in a way that the structures, hence the expensive panels as well, may be quickly and efficiently brought into a protective structure, like, for example a garage.

BRIEF SUMMARY OF THE INVENTION

In one embodiment of the present invention an electricity generating canopy appliance is provided, comprising a rectangular framework having a length L, a width W, and a height H, comprising four corner posts of d"×d" square metal tubing with cross beams at the upper ends of the posts forming a rectangular top, a rectangular base plate of width W, length L and thickness T equal or less than 1" lying flat on a support surface with the corner posts of the rectangular framework joined securely to the baseplate at corners of the baseplate, a plurality of solar panels mounted to the top of the rectangular framework in a horizontal aspect in a pattern covering all area of the top of the framework, a plurality of solar panels hinged along a long edge of each solar panel to a top edge of a first side of the framework, and a plurality of solar panels hinged along a long edge of each solar panel to a top edge of a second side of the framework, one solar panel of a length equal to width W of the rectangular framework, hinged along the length of the solar panel to a top edge of a first end of the framework, and one solar panel of a length equal to width W of the rectangular framework, hinged along the length of the solar panel to a top edge of a second end of the framework, support apparatus hinged to posts on each side of the framework, adapted in a raised position to support the plurality of solar panels hinged on each side of the framework with the solar panels rotated upward to a horizontal aspect, support apparatus hinged to posts on each end of the framework, adapted in a raised position to support the one solar panel hinged on each end of the framework with the solar panels rotated upward to a horizontal aspect, circuitry and wiring connecting the solar panels to a cable ending in a connector compatible with and connected to an inverter, two auxiliary wheels each having a shock absorber and a spring, one assembled to each one of two corner posts at one end of the rectangular framework, and deployed away from the framework in a direction of the length; and a bracket assembled across two corner posts of the frame at an end opposite the one end, presenting a hitch to a ball of a trailer dolly having two wheels deployed within the framework and a ball hitch extending away from the framework in the direction of the length opposite the direction of deployment of the two auxiliary wheels.

In one embodiment the rectangular base plate has corner regions of d'×d" matching the bottom of each post, with lengthwise and widthwise spans of a span width equal to or less than d" forming edges of the baseplate. Also, in one embodiment there is a minimum clearance of six feet to the rectangular top, the ends have a minimum width of six feet between posts and the sides have a minimum length between posts equal to or greater than six feet, such that vehicles may be driven over spans of the baseplate and through the length or the width of the canopy or may be parked under the canopy. In one embodiment the appliance further comprises four removable wheel assemblies joined one to each corner post at a lowermost portion of each post such that installing all four wheel assemblies raises the canopy appliance a distance D, and enables the canopy to be rolled on the wheels of the wheel assemblies. And in one embodiment the appliance further comprises an anchor plate fastened from span to span across each corner of the baseplate inside the post at each corner with a pattern of holes accommodating anchor bolts.

In one embodiment the appliance further comprises anchors compatible with the anchor bolts, the anchors installed in the support surface in a pattern matching the pattern of the holes in all four anchor plates installed on the framework, enabling the canopy appliance to be rolled over the pattern of anchors in the support surface, the wheel assemblies to be removed setting the canopy down on the support surface, and the anchor bolts to be inserted through the holes in the anchor plates and engaged to the anchors, firmly anchoring the canopy appliance to the support surface. In one embodiment d=4 inches. Also, in one embodiment there are a minimum of two solar panels in the plurality of solar panels mounted to the top of the rectangular framework, two solar panels in the plurality of solar panels hinged along a long edge of each solar panel to a top edge of each side of the framework, and one solar panel hinged on each end of the framework, totaling nine solar panels connected in the canopy appliance. In one embodiment the cross beams at the upper ends of the posts forming a rectangular top to the framework comprise 4"×4" L-shaped cross beams along each side at the top and 2"×2" cross beams across each end at the top. And in one embodiment the appliance further comprises 4"×4" angled braces from the cross beams along each side to the posts at each corner.

In one embodiment the support apparatus hinged to posts on each side of the framework adapted in a raised position to support the plurality of solar panels hinged on each side of the framework with the solar panels rotated upward to a horizontal aspect, each comprise two arms, each arm hinged to posts at each end of a side at a point below the top and above the base plate, and a lateral bar joined to ends of the arms away from the posts. Also, in one embodiment the arms are of 4"×4" square tubing, each hinged to the post, and the bracket has two locking pins that engages two holes in the arm when the arm is raised, positioning the lateral bar to support the hinged solar panels on the side in a horizontal plane, coplanar with the solar panels on the top. In one embodiment the support apparatus hinged to posts on each end of the framework adapted in a raised position to support the single solar panel hinged on each end of the framework with the solar panels rotated upward to a horizontal aspect, each comprise two arms, each arm hinged to posts at each side of an end at a point below the top and above the base plate, and a lateral bar joined to ends of the arms away from the posts, the lateral bar adapted to engage the solar panel in the raised aspect.

In one embodiment the solar panels are bifacial panels in which both sides of the panels are active. In one embodiment each wheel assembly comprises a first and a second L-bracket each the width of a post mounted securely to opposite sides of the post at different heights, a third L-bracket wider than the post having holes at a angle though the third L-bracket in portions outside the width of the post, and a fourth L-bracket wider than the post engaged beneath the second L-bracket and having holes in regions outside the posts matching the holes in the third L-bracket, at the angle of the holes in the third L-bracket, the fourth L-bracket having a universal caster with a wheel mounted facing down, with threaded rods and nuts coupling the third and fourth L-brackets through the angled holes, such that tightening the nuts on the threaded rods draws the fourth L-bracket down against the second L-bracket, lowering the caster wheel against the support surface and raising the canopy on the wheel. In one embodiment the inverter is a combination inverter/charger having cables and connectors for charging electric vehicles. And in one embodiment the inverter is connected electrically to house or business wiring, and with the framework deployed and the solar panels exposed to sunlight the system provides electric power to the home or business, to a connected public or private grid, or to charge electric vehicle batteries.

DETAILED DESCRIPTION OF THE INVENTION

Figure 1:
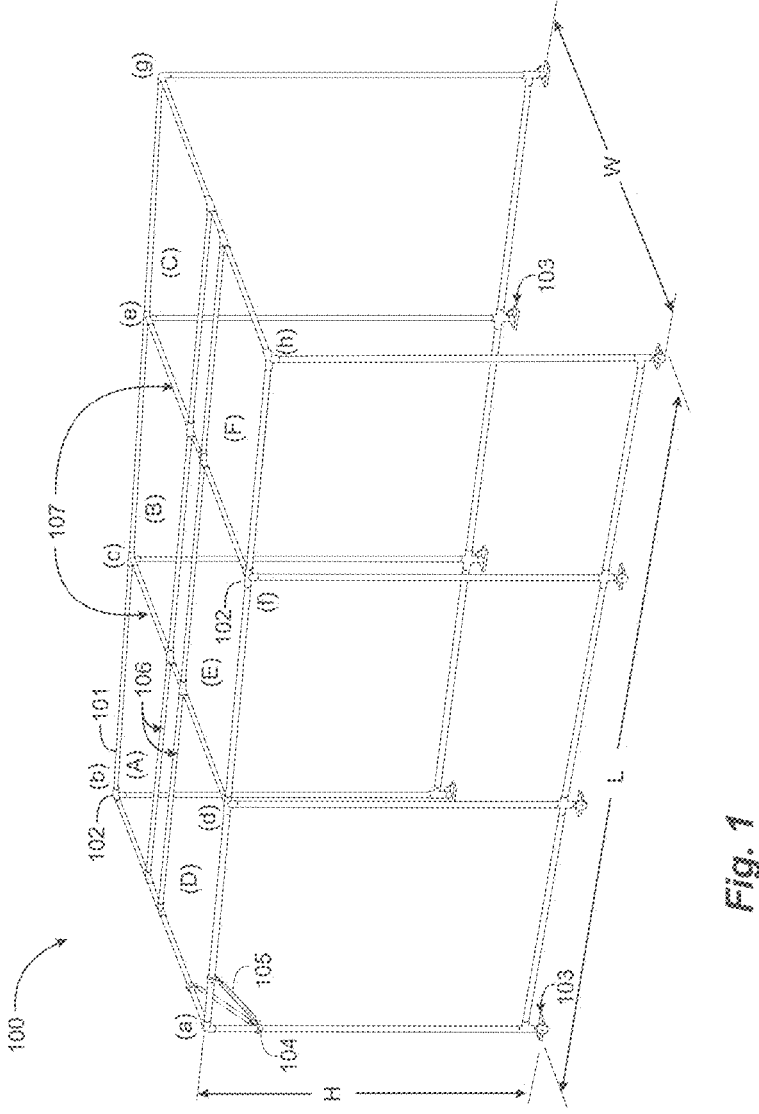
FIG. 1 is a perspective view of a movable framework in an embodiment of the present invention.

FIG. 1 is a perspective view of a movable framework 100 in an embodiment of the present invention. Framework 100 in this example is constructed of aluminum tubing sections such as section 101 which are joined by cast aluminum fittings such as fitting 102, which is a corner fitting. Many such fittings are commercially available. In the present example the tubing is standard 2.0 inch OD aluminum tubing, and once joined with a fitting tubing sections are TIG welded to the fittings.

Each upright (vertical) element in framework 100 ends at the lowermost extremity with a wheel assembly such as assembly 103. In this example there are eight such wheel assemblies. In some embodiments there may be more or fewer than eight, and the wheel assemblies may have a locking brake. In alternative embodiments the wheels may be extendable and retractable, such that the framework may be caused to rest directly on a supporting surface with the wheels raised.

One corner (a) of the framework is shown to be reinforced by braces 105 between clamps 104 fastened to the aluminum tubing. Although not explicitly shown in the figure, corners (b) through (g) may be similarly braced, and typically will be so braced. This triangulation adds needed strength and rigidity to the framework.

In FIG. 1 it is seen that the framework has a horizontal upper level defined by corners (a), (b), (h) and (g). This upper level is divided in this example by two lengthwise tubing arrangements 106 and by two lateral tubing arrangements 107, into six rectangular regions labeled in this example (A), (B), (C), (D), (E) and (F). These regions are sized by the placement of these tubing arrangements to be of the size of solar panels to be used with the system, as is described in enabling detail below.

Framework 100 has a height H, a width W, and a length L in this example, and these dimensions are important to the purpose of the invention. In one embodiment the framework supports solar panels in a solar panel system that doubles as a canopy and utilizes driveway space to expose solar panels to sunlight to generate electrical energy, which may be used both for supplementing electrical power in a household or commercial building associated with the driveway or parking space, and to charge batteries for electrical vehicles that may be under the framework or in a nearby garage. Width W for purposes of the invention needs to be wider than an automobile associated with the system in a use case, but more narrow than a width of a garage doorway associated with the system, length L needs to as long as or longer than the automobile, and height H needs to be higher than the overall height of the automobile but less than the height of the garage door. It will be apparent that these dimensions may vary depending on use case and application, but one set of dimensions may well work for most applications.

Figure 2:
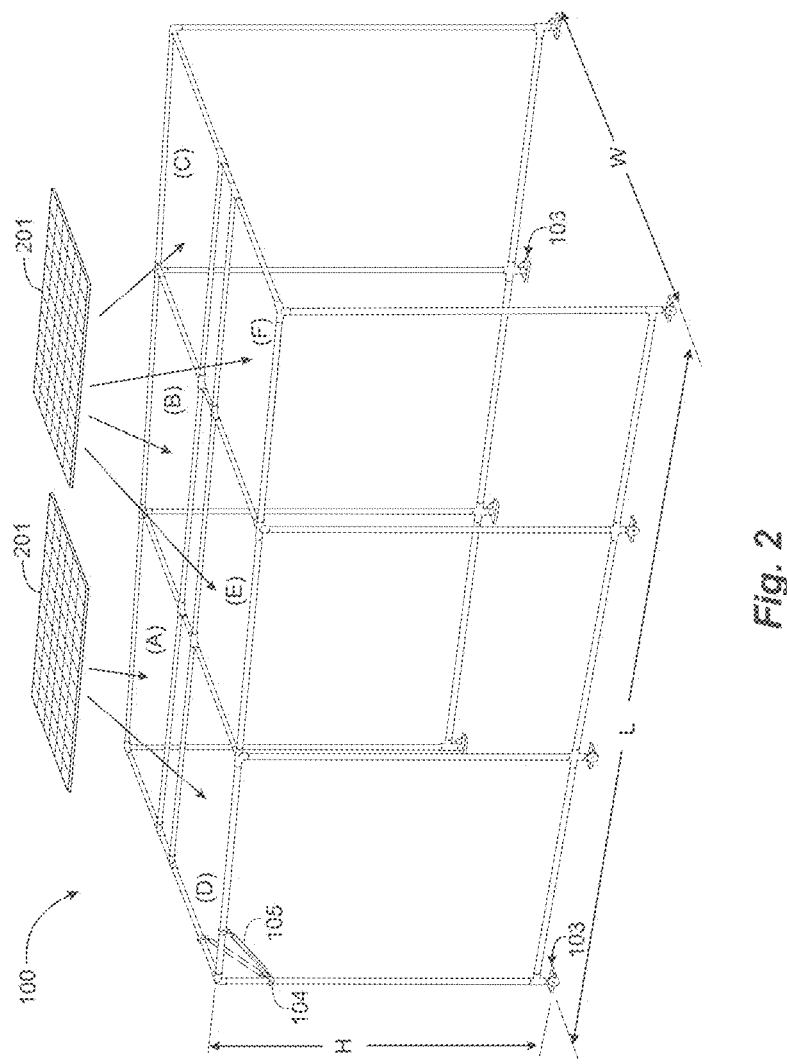
FIG. 2 is a perspective view of the framework of FIG. 1 showing where solar panels are mounted in an embodiment of the invention.

FIG. 2 is a perspective view of framework 100 of FIG. 1 with solar panels 201 shown to be added to regions (A) through (F). In this example the solar panels are GCL-M6/72DH Bifacial panels. Bifacial means that the 12 solar cells that make up one solar panel 201 are made to be active on both sides. When installed in regions (A) through (F) of the framework these six panels will be active especially for sunlight from above but will also be active and will generate electricity by reflected sunlight from surfaces of a vehicle under the framework.

Figure 3:
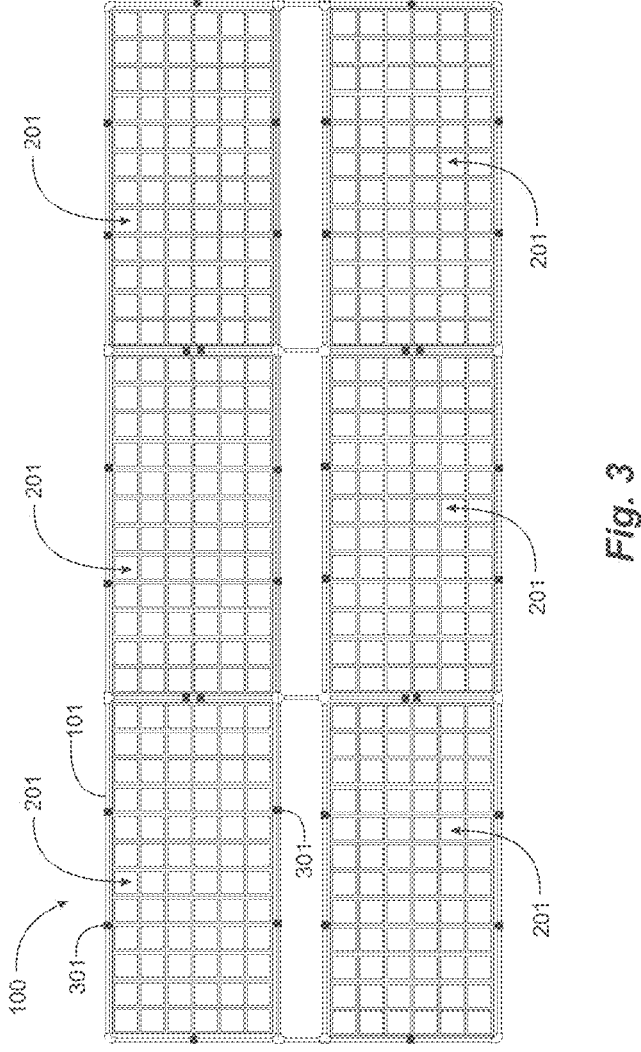
FIG. 3 is a plan view of an upper level of the framework showing six solar panels mounted in an embodiment of the invention.

FIG. 3 is a plan view of the upper level of framework 100 with solar panels 201 installed in each of the six regions (A) through (F) in this example. In this example the solar panels are GCL-M6/72DH Bifacial panels as indicated above, with each panel about 80 inches in length, so the overall length of the structure is a little more than three times this dimension, or about 20 feet in length. The width is about 8 feet.

The solar panels are retained within each of regions (A) through (F) by use, in this example, of connectors 301, which in this example are clamps that are attached over the 2 inch tubes of the tubular frame, and connect to holes on the sides of the solar panels. This, it will be understood, is just one of a variety of ways that the solar panels may be secured in the regions of the framework. In the example of FIG. 3 there are 6 solar panels exposed to sunlight, but the structure in embodiments of the invention is not limited to 6 panels.

Figure 4:
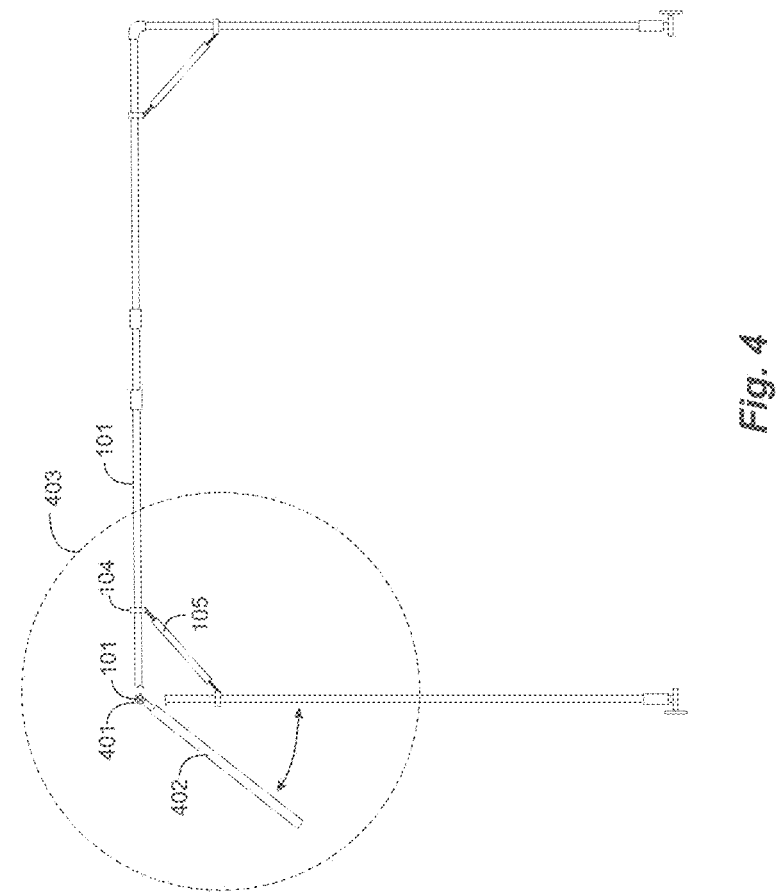
FIG. 4 is an end view of the framework showing how additional solar panels may be added to the framework.

FIG. 4 is an end view of framework 101 showing mounting of additional panels to outside tubes of the framework in a manner that the additional panels may be rotated into a horizontal position for maximum effect and may be rotated to a nearly vertical position to enable the framework to minimize the overall width to enable the structure to be moved, for example, from a driveway to inside a garage. In FIG. 4 a corner cast aluminum fitting is removed in the figure to show a clamp mechanism 401 mounted to a lengthwise upper tubing, with the clamp mechanism attached to a panel frame 402 which may hold a solar panel. The frame 402 is shown at an angle of about 30 degrees from vertical but may be lowered to minimize the overall width of the structure or raised so that a mounted solar panel in frame 402 may be horizontal for maximum sunlight exposure.

Figure 5:
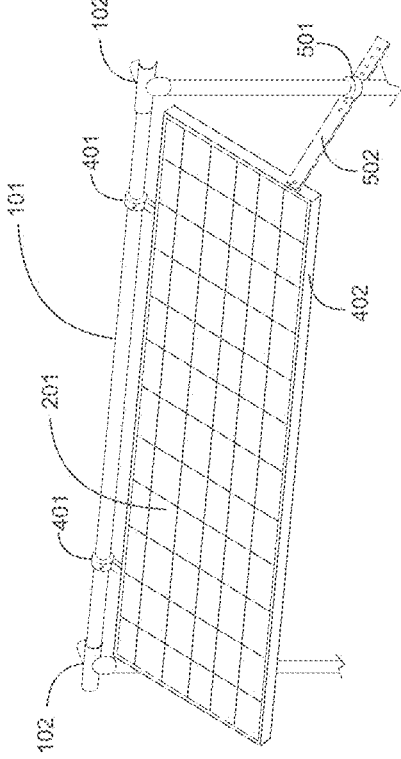
FIG. 5 is a perspective view of a frame mounted to the side tubing to better illustrate the nature of the mounting in this embodiment.

FIG. 5 is a perspective view of frame 402 mounted to the side tubing 101 to better illustrate the nature of the mounting in this embodiment. Frame 402 mounts a solar panel 201 the same as the solar panels mounted in the upper level as shown in FIG. 3. Clamp mechanisms 401 may be loosened to rotate frame 402 and tightened to secure the frame, and therefore the solar panel, at a new attitude, including a horizontal attitude parallel with the solar panels mounted in the upper level. In an alternative embodiment there may be props 502 connecting to anchors 501 by which the side panels may be raised or lowered. It will be apparent that there are a variety of ways that side frames 402 carrying solar panels may be raised or lowered.

As many as six frames 402 with solar panels 201 may be provided along the sides of the framework, three along each side, which effectively doubles the number of solar panels in the apparatus, to twelve.

Figure 6:
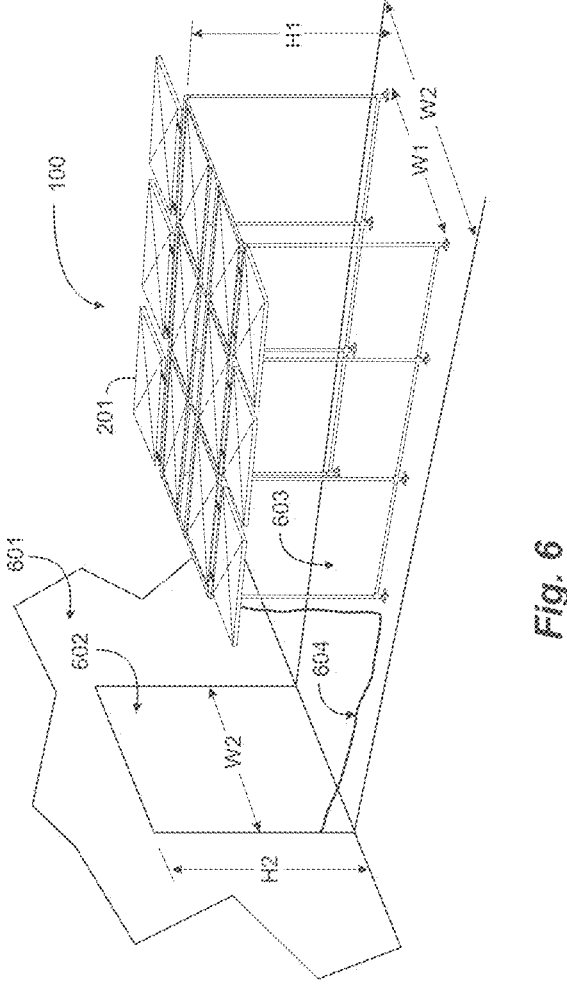
FIG. 6 illustrates the movable framework with mounted solar panels positioned in a driveway leading to a garage door.

FIG. 6 illustrates movable framework 100 with a full complement of mounted solar panels 201 positioned in a driveway or parking space 603 leading to a garage door 602 in a side of a home or business 601. It may be seen that the extra side panels to each side of the framework are deployed level with the solar panels in the top of the framework such that all twelve solar panels are parallel and horizontal. Width of the driveway is W2 which is greater than the width W1 of framework 100. The width of the garage door opening is also W2, the same as the width of the driveway in this example. The height of the framework H1 is less than the height w2 of the garage door. The deployment of the side panels provides maximum energy generation, which is routed to an inverter in the garage by a cable 604, but this makes the overall width greater than the width W2 of the garage door. In this configuration the moveable framework cannot be rolled into the garage.

Figure 7:
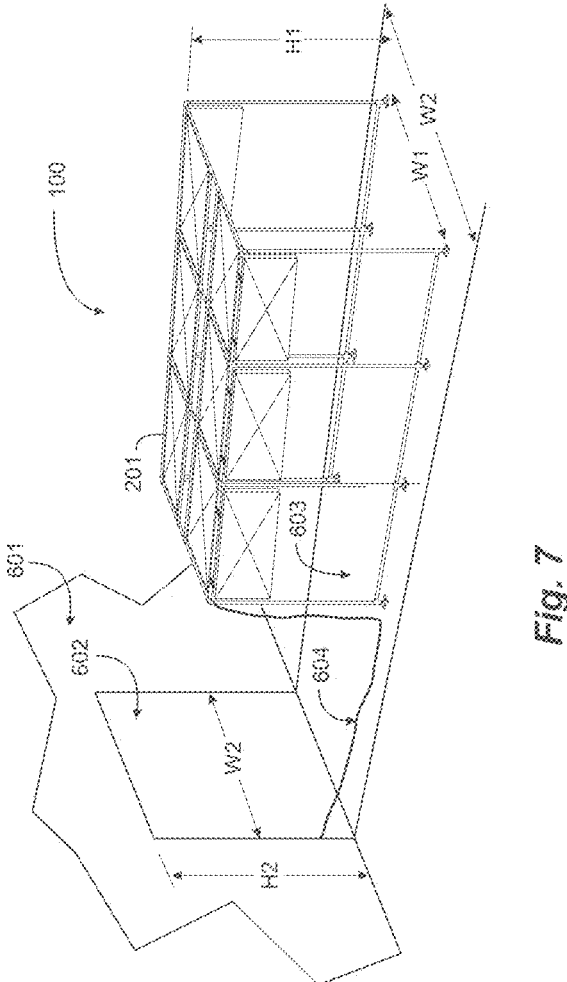
FIG. 7 is a perspective view of the framework in the driveway with outside panels lowered.
Figure 8:
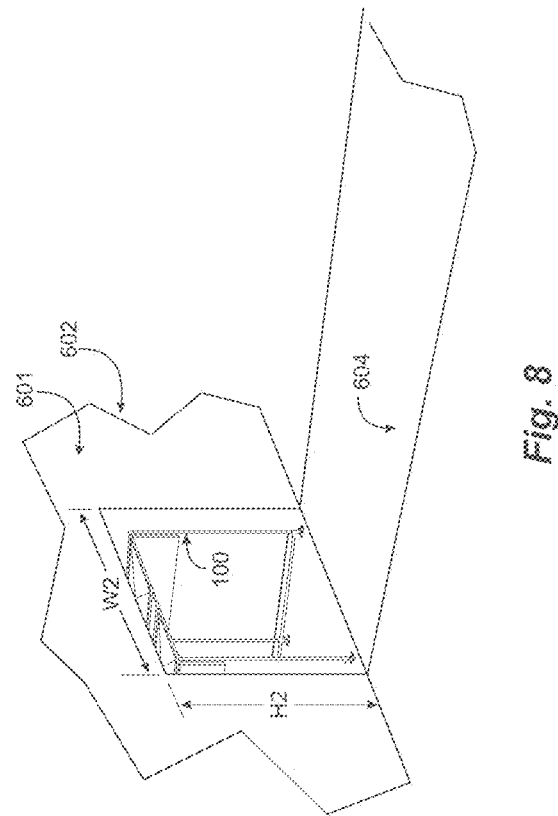
FIG. 8 is a perspective view of the driveway with the framework rolled into the garage.

FIG. 7 illustrates the circumstance of FIG. 6 except the side panels have been retracted to a vertical position, reducing the overall width of the framework with panels to W1. In this configuration the framework with panels may be rolled into the garage through the garage door. FIG. 8 illustrates the framework 100 with solar panels moved into the garage through the garage door.

In the examples shown and described, with a framework with solar panels stored in the garage, an automobile, a truck or motorcycles may still be parked in the garage beneath the framework, as the inside height and width of the framework is high and wide enough to clear most automobiles. A user may open the garage door and manually roll the framework on wheel assemblies 103 out of the garage through the garage door, trailing cable 604 until the framework is fully deployed in the driveway. The side panels may then be deployed level, and the system will generate electricity. At a time when a weather event, or for some other reason it is determined to store the framework in the garage the side panels may be lowered, the garage door opened, and the framework may be rolled back into the garage with enough space to also park the car underneath.

Figure 9:
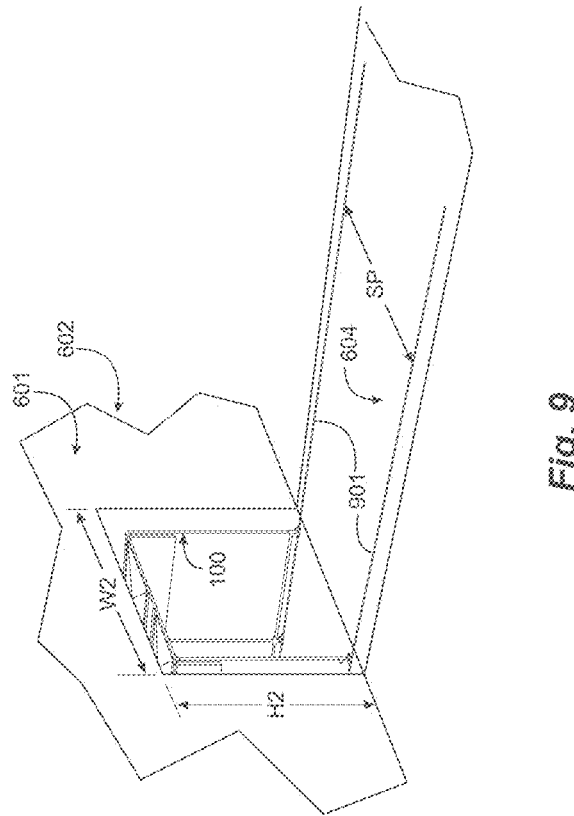
FIG. 9 is a perspective view of a driveway with tracks to guide the framework as the framework is moved.

Cable 604 in one embodiment ends in a standard 240 volt connector, which may be plugged into an inverter to connect into the house or business wiring, and the solar panel system will supplement electrical usage in the home or business as an electricity generating appliance. In one embodiment the inverter is a Solar Edge™ HD Wave inverter which accepts a 240V connector and also provides connectors for charging electric vehicles. The inverter in one embodiment is mounted just inside the garage door but may be positioned elsewhere as well. The entire system functions as an electricity generating, portable appliance in one unit. FIG. 9 illustrates an embodiment of the system wherein optional tracks 901 are provided on the driveway at a spacing SP to match the distance between wheels 103 on the movable framework. The optional tracks may be either cut into the driveway or strips of material may be laid onto and adhered to the surface of the driveway to form the tracks. The optional tracks guide the framework both going into and coming from the garage.

Figure 10:
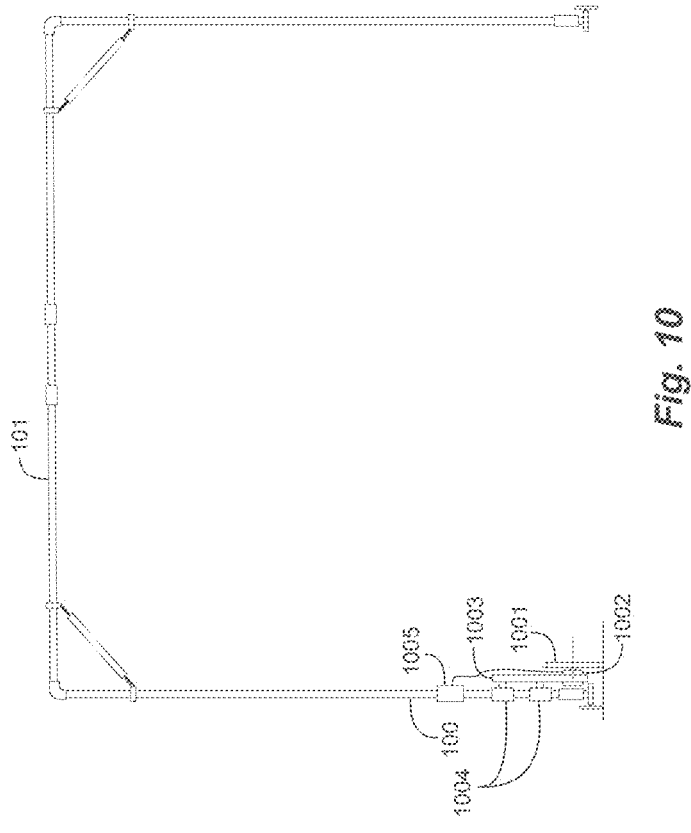
FIG. 10 is an end view of the framework in an embodiment employing a drive motor and wheel.

FIG. 10 illustrates an alternative embodiment wherein a single wheel 1001 driven by a DC motor 1002 mounted in a frame 1003 fastened to an upright of the framework by clamps 1004 is provided on one side at a lower level of the framework at the end of the framework that first enters and last leaves the garage. The motor may be driven in either direction and turned on and off to propel the framework from the garage and to bring it back into the garage. On-off and direction inputs may be provided on a small junction box 1005 fastened to an upright of the framework near the motor and wheel. In an alternative embodiment there may be circuitry in junction box 1003 with Bluetooth or other wireless communication capability, and an application may be provided on a smart phone with an interactive interface to operate the drive wheel to propel the framework into or out of the garage. This apparatus works best in an embodiment wherein tracks, as in FIG. 9, are provided to constrain the wheels 103 of the framework.

In one embodiment cable 604 that connects the solar panels of the apparatus of the invention to an inverter may be wound on a reel in the garage with spring constraint, such that the cable plays out as the framework is moved from the garage to a position in the driveway, and winds back on the reel as the framework re-enters the garage.

Figure 11A:
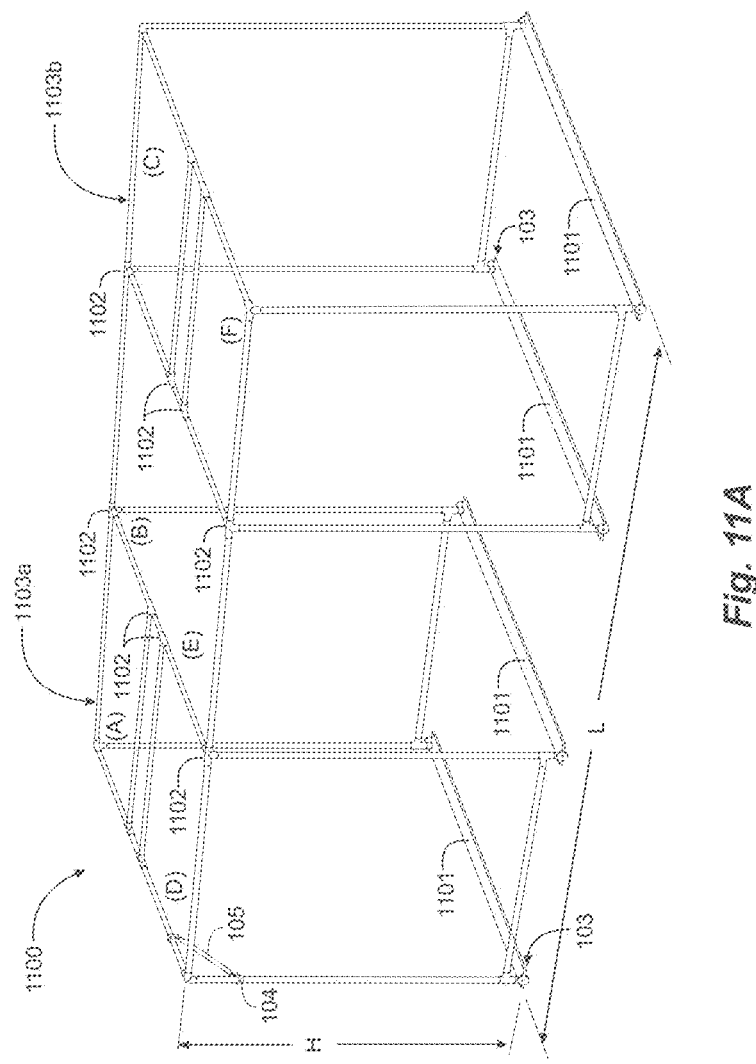
FIG. 11A is a perspective view of a solar canopy structure in another embodiment of the invention.

FIG. 11A is a perspective view of a structure for a portable solar canopy in another embodiment of the invention. In this embodiment two rectangular structures 1103a and 1103b that are mirror images are joined by tubes only at the upper level, the tubes engaged in fittings 1102 that are fittings that enable the tubes to be engaged and disengaged. The structures are joined side-to-side additionally by flat bars 1101.

In this embodiment wheel assemblies 103 are of a commercially available sort well-known in the art that may be deployed and retracted such that the structure may be slightly raised on caster wheels that allow universal horizontal movement and lowered to cause the structures to rest on the flat bars 1101.

With the structures 1103a and 1103b joined as shown in FIG. 11A solar panels may be mounted exactly as described above with reference to FIG. 2 and also referenced in other descriptions, and the joined structure may reside on a driveway providing electricity generation just as described herein in other embodiments.

Figure 11B:
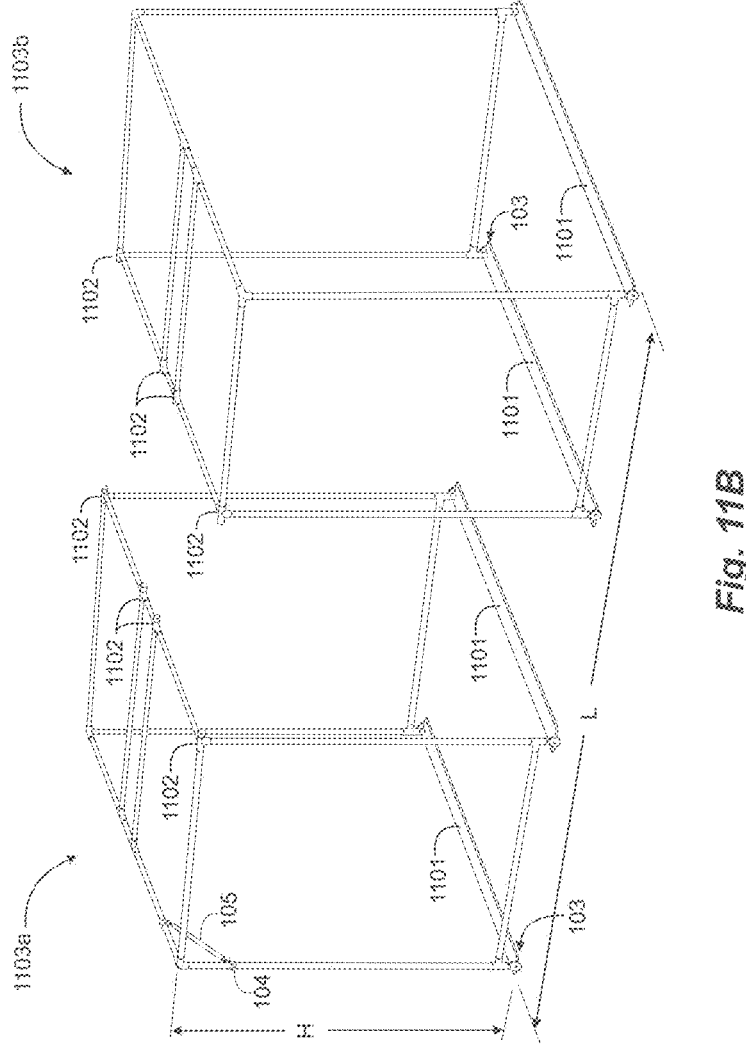
FIG. 11B is a perspective view of the structure of FIG. 11A with tubings removed to produce two separate portable units.

When a user has determined to store the portable solar canopy in a garage or other storage area the user may disconnect the tubes joining structures 1103a and 1103b by releasing the tubes joined by fittings 1102 and removing the tubes. FIG. 11B illustrates the result, with structures 1103a and 1103b now separate structures, separately movable. The user may now deploy the caster wheel mentioned above to raise the structures separately on the caster wheels, and each structure may be separately rotated and moved into the garage separately. This innovation provides a means of moving and deploying the overall structure of the portable solar canopy that is easier for the user to manually manipulate.

In one embodiment of the invention individual ones of the solar panels may be connected directly to a micro-inverter, converting the direct current (DC) produced to an alternating current (AC).

Having illustrated and described a number of examples of the invention it is again emphasized here that the framework is open both in the front and the rear with sufficient height and width that a user may park an automobile or other vehicle under the framework with the framework positioned in the driveway to present solar panels to sunlight. Moreover, the user may drive a vehicle under and through the framework and into the garage. The system of the invention presents no real impediment to the use of the garage or the driveway.

MEGA Version

In alternative embodiments of the invention a more robust and serviceable version of the solar canopy appliance is provided with additional functionality over the embodiments described above. MEGA stands for Mobile Electricity Generating Appliance.

Figure 12:
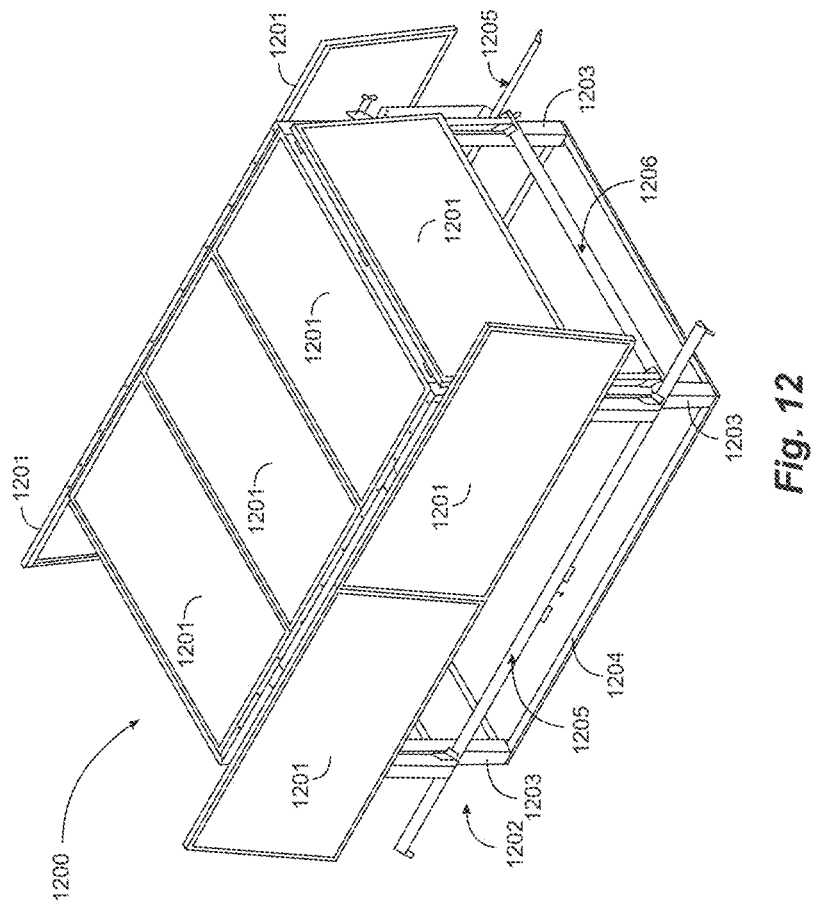
FIG. 12 is a perspective view of a MEGA canopy in one embodiment of the invention.

FIG. 12 is a perspective view of a VEGA canopy 1200 in one embodiment of the invention. Canopy 1200 comprises nine (9) bifacial solar panels 1201 one of which is not seen in FIG. 12, being implemented on a far end of the canopy not visible in the view of FIG. 12. In FIG. 12 panels 1201 are carried on a sturdy framework 1202 having four corner posts 1203 (three corner posts are visible in FIG. 12) that are made from 4"×4" aluminum square tubing stock. In one embodiment the wall thickness of the square tubing stock is ⅛ inch, but in some instances, for a more sturdy version, tubing with a wall thickness of 3/16 inch or even ¼ inch may be used. Two solar panels 1201 on each long side and one solar panel on each width end are hinged at an upper edge and folded down in a position suitable for moving the portable solar panel. Lengthwise and widthwise cross braces are implemented in framework 1202 but not seen under the folded down solar panels on the sides and ends of the canopy.

A rectangular flat base 1204 with four sides each in one embodiment one-half the width of a post 1203 (2") lies flat on a support surface, such as a driveway, which support surface may be concrete or asphalt, and posts 1203 of framework 1202 are joined to this base at the four corners, such as by steel bolts.

Two lengthwise support structures 1205 are hinged to corner posts 1203 on each long side in a manner that the support structures may be deployed to support the two solar panels on each side of the canopy when those panels are raised on their hinged edges to a horizontal plane with the solar panels on the top of the canopy. Similarly, there are two support structures 1206, one on each end of the canopy, hinged to the corner posts of the framework on each end, which may be deployed to support the single solar panels on each end of the canopy when those panels are raised on their hinged edges to a horizontal plane with the solar panels on the top of the canopy. When the four side and two end solar panels are raised and supported horizontally there are nine (9) solar panels in a horizontal plane displayed to catch maximum rays.

Figure 13:
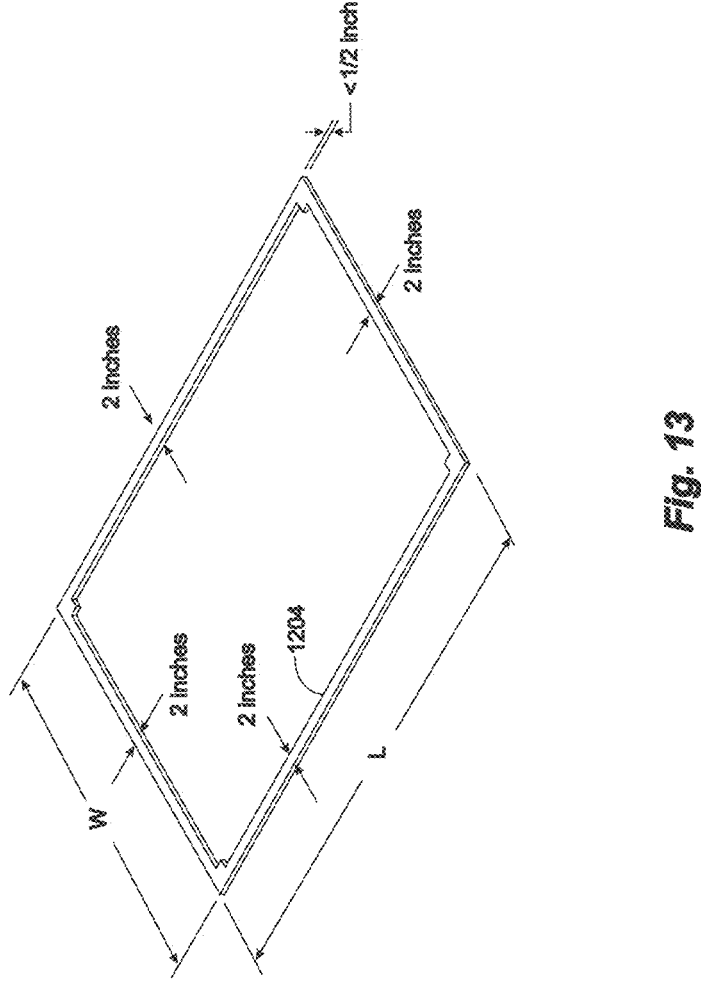
FIG. 13 illustrates a rectangular flat base of the canopy of FIG. 12 in an embodiment of the invention.

FIG. 13 illustrates rectangular flat base 1204 in the same aspect as in FIG. 12. Base 1204 lies flat on the supporting surface, which may be a driveway surface, such that, with the framework 1202 engaged and the solar panels raised, a car, truck or other vehicle may be driven over the base under the canopy through either the ends or the sides of the canopy. Base 1204 has a length L and a width W which are also the width and length of the framework in a canopy on the base. In one embodiment W is about 8 feet and length L is about 20 feet, but both of these dimensions may be different in other embodiments. A 4" by 4" region is implemented on each corner of base 1204 to mate with the 4"×4" bottom of the corner posts 1203. In an alternative embodiment the width of each span of the base may be 4" rather than two inches.

Base 1204, having a limited height, such as equal to or less than one-half inch, provides considerable structural support for the framework and presents very little impediment to a vehicle driven over a span of the base. The length and width of base 1204 may vary in different embodiments, but with framework posts 1203 at 4 inches square, the width of each span of base 1204 will be 4 inches.

Figure 14:
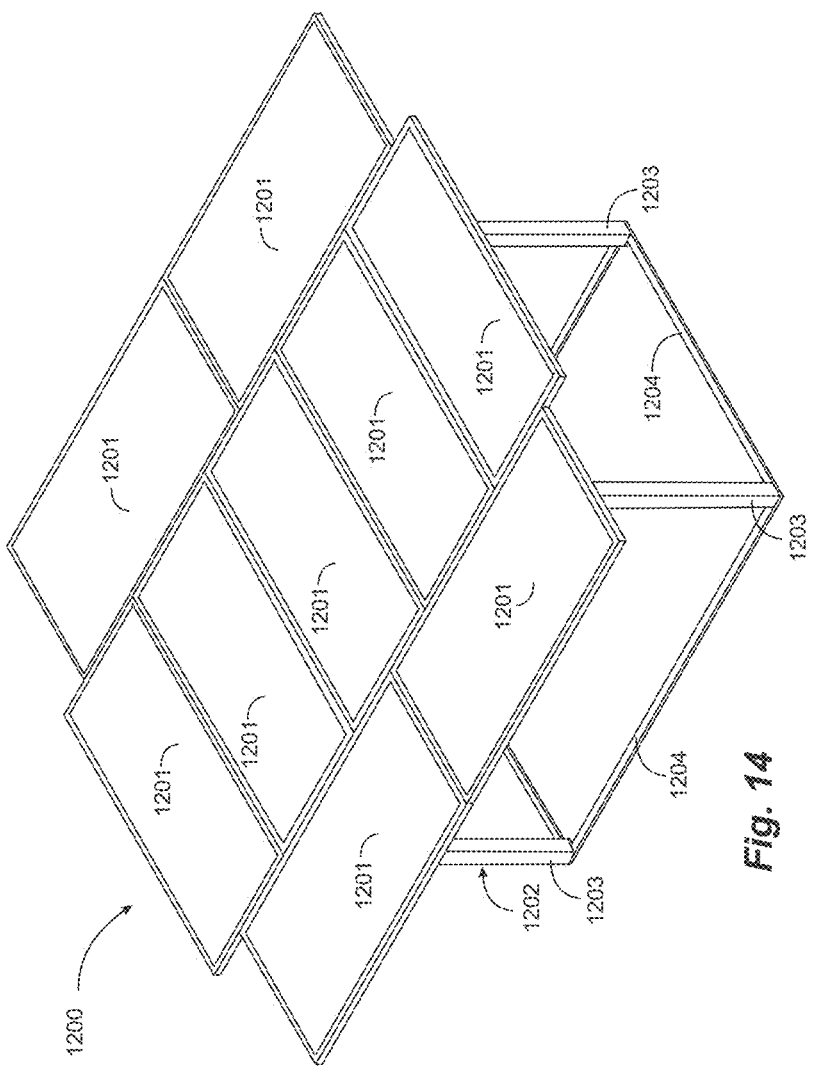
FIG. 14 is a perspective view of the canopy of FIG. 12 with solar panels raised in an embodiment of the invention.

FIG. 14 illustrates the canopy 1200 with the six hinged solar panels raised to the horizontal plane of the three solar panels that are arrayed across the top of the framework and are not hinged. The apparatus 1205 and 1206 that are hinged on the corner posts are not seen in FIG. 14 under the solar panels. FIG. 14 shows the canopy in an arrangement for operation, with all of the solar panels in horizontal aspect and coplanar.

Figure 15:
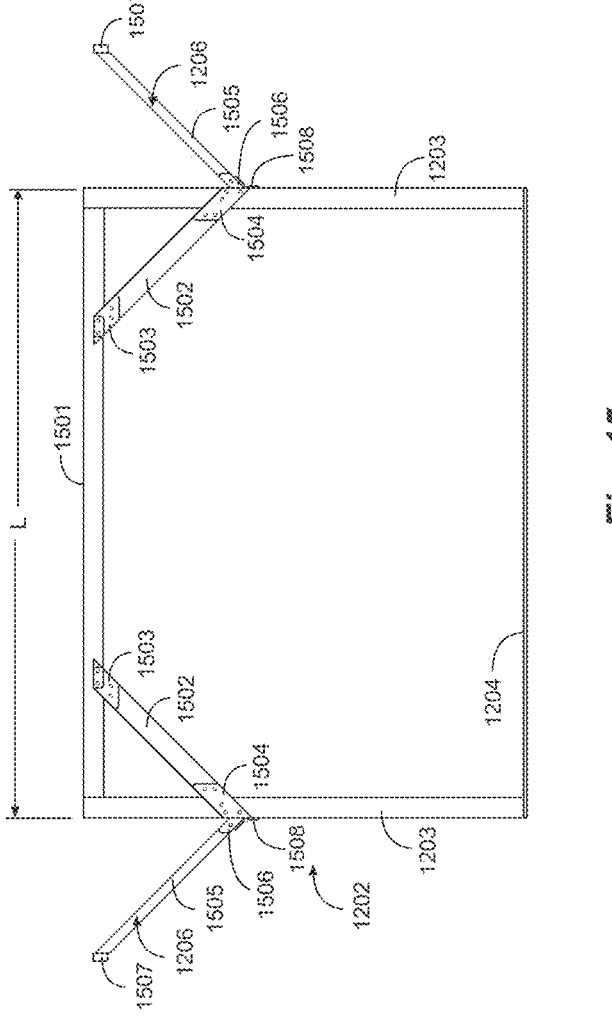
FIG. 15 is a side elevation view of a framework of the canopy of FIG. 12 in an embodiment of the invention.

FIG. 15 is a side elevation view of framework 1202 with apparatus 1206 on hinges 1508 on each end raised in position to support the single hinged solar panels on each end of the canopy in a horizontal aspect. Apparatus 1206 in FIG. 12 is shown as folded down against posts 1203, which allows the solar panels on the ends to fold down to a vertical aspect. Each apparatus 1206 comprises an arm 1505 made from square aluminum tubing, hinged in a bracket 1506 that is fastened to post 1203. A rail 1507 fastened in a horizontal aspect at ends of arms 1505 supports the end solar panels in the raised aspect.

A 4-inch L-shaped beam 1501 in this example spans between posts 1203. Beam 1501 is supported on each end to posts 1203 by a 4-inch square brace 1502 fastened between brackets 1503 and 1504, which brackets in this example fasten respectively to the beam and to the posts.

Figure 16:
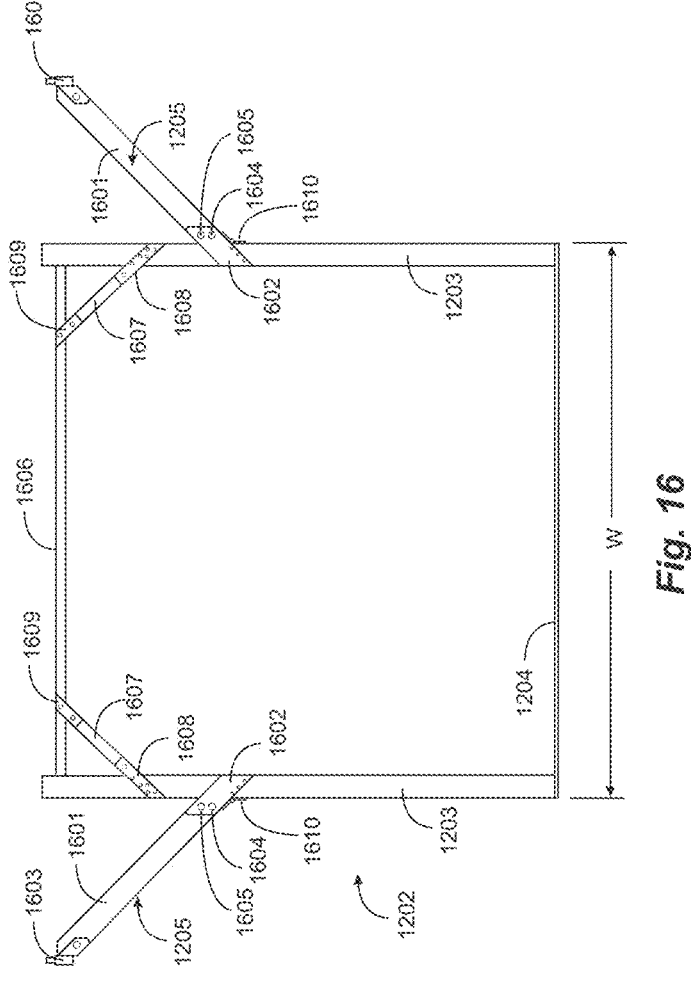
FIG. 16 is an end elevation view of a framework of the canopy of FIG. 12 in an embodiment of the invention.

FIG. 16 is an end elevation view of framework 1202 with hinged apparatus 1205 on each side raised in position to support the two hinged solar panels on each side of the canopy in a horizontal aspect. Apparatus 1205 in FIG. 12 is shown as folded down against posts 1203, which allows the solar panels on the sides to fold down to a vertical aspect. Each apparatus 1205 comprises an arm 1601 made from 4" square aluminum tubing in this example, hinged in a bracket

1602 that is fastened to post 1203. A rail 1603 fastened in a horizontal aspect at ends of arms 1601 supports the side solar panels in the raised position. Arm 1601 pivots on a hinge 1610, pins 1604 & 1605 are inserted in the raised position to support arm 1601.

Canopy 1200 as described in the VEGA version is intended to be deployed on premises, such as on a driveway in front of a garage, on a semi-permanent basis. Earlier versions described above had deployable and retractable wheels such as wheel assemblies 103 described above. It has been determined that it may be better to have removable wheel assemblies, since the canopy may need to be moved only occasionally, and the wheel assemblies may be best not exposed to the elements except when needed. Further, it has been determined there needs to be a means of anchoring the canopy to the surface upon which it rests, as some driveways are not level, and wind may occasionally be a problem. In some regions tornadoes or hurricanes may be a problem.

Figure 17:
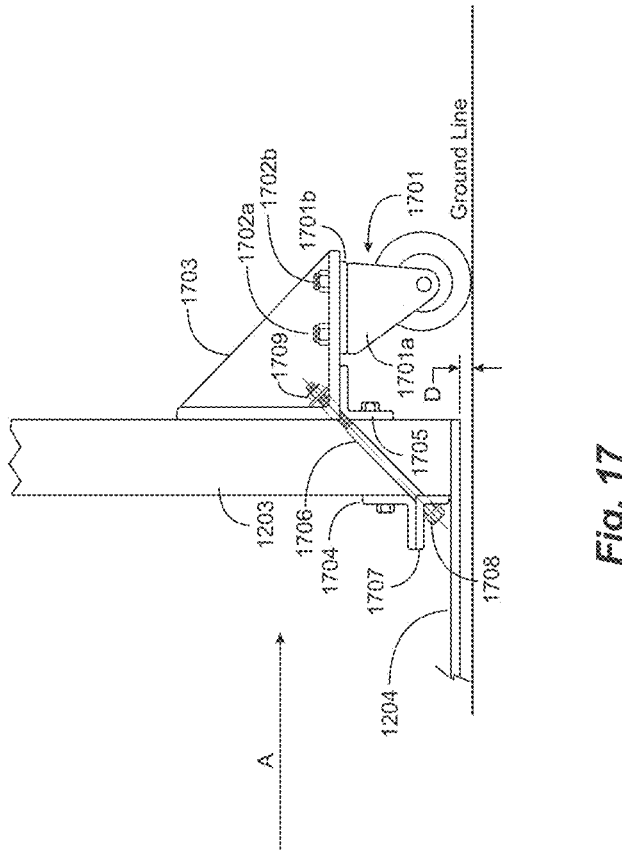
FIG. 17 illustrates a high-load wheel assembly mounted to a post in an embodiment of the invention.

FIG. 17 is an elevation view of one corner post 1203 of the MEGA version canopy illustrating a removable, high-load wheel assembly 1701 having a wheel made in this example from a Ultra High Molecular weight (UHMW) polymer. Wheel assembly 1701 has an upper portion 1701*b* that bolts under a bracket 1703 by four nuts and bolts of which 1702*a* and 1702*b* may be seen in the figure, and a lower part 1701*a* that is free to rotate relative to part 1701*b* around a vertical axis. Bracket 1703 is about two inches wider than post 1203 in this example, about six inches, and extends one inch from each side of post 1203. Bracket 1703 is not bolted to post 1203, but rests on an L-bracket 1705 that is the width of the post, four inches, and is bolted to post 1203. A second L-bracket 1704 also of four-inch width is bolted to post 1203 on an opposite side from L-bracket 1705 at a predetermined lower position. A third L-bracket 1707 has a width of six inches, like bracket 1703, and two holes at an angle, passing through the bracket at the corner as shown, in the extended portions outside the post. Bracket 1703 has similar holes in the extended portions outside the post. Some embodiments use angles between 10 and 80 degrees and preferably between 25 and 65 degrees. Two long steel bolts 1706 in this example pass through the angled holes in brackets 1703 and 1707 and are constrained at the top end by a nut and washer 1708 and 1709. Only one bolt and one nut and washer is seen in this view.

A person of skill in the art will understand that with nut 1709 loosened such that bracket 1703 is not urged against bracket 1705, the framework of the canopy will rest on the supporting surface at the ground line. As the nuts are tightened, bracket 1703 is drawn against bracket 1705, and the framework is lifted from the ground line to a height "D" which is determined by the relative positions of brackets 1704 and 1705.

Figure 18:
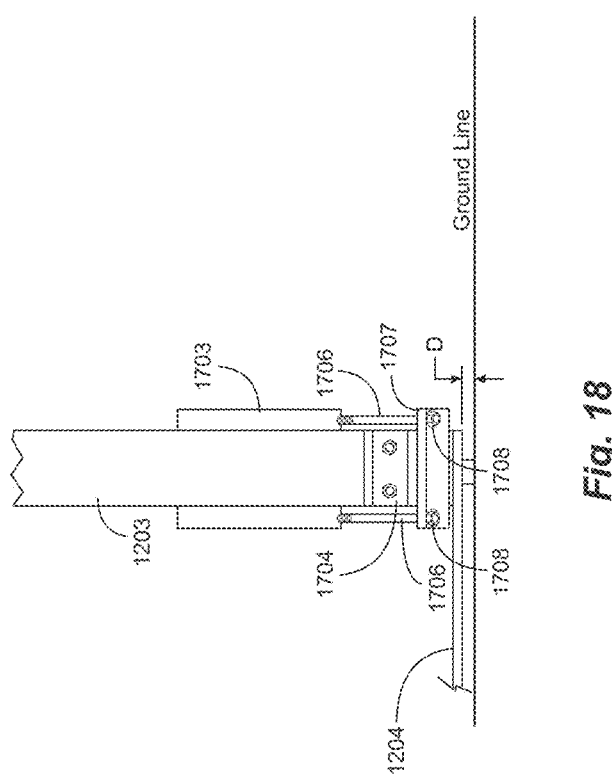
FIG. 18 illustrates the wheel assembly of FIG. 17 from a different viewpoint in an embodiment of the invention.

FIG. 18 is a view of the assembly of FIG. 17 in the direction of arrow A in FIG. 17, to better illustrate the nature of the assembly. Bracket 1704 is seen bolted to post 1203 on the near side of the post, and bracket 1707 is seen with bolt 1706 passing through at an angle. Bracket 1703 may be seen on the far side of post 1203 with threaded rods 1706 passing through bracket 1703 at an angle. The threaded rods are secured to bracket 1703 by nut and washer sets 1709, not seen in FIG. 18 but shown in FIG. 17.

The apparatus illustrated in FIGS. 17 and 18 may be implemented at all four corners of the canopy 1200, and once installed and secured the entire canopy is raised on wheels and may be moved along the supporting surface either to store in a garage or other storage facility. The canopy may be moved as well on the wheels to a different location or onto a conveyance vehicle to be carried away.

The inventor believes the apparatus shown in FIGS. 17 and 18 is capable of supporting the considerable weight of the MEGA version of the canopy and facilitating the mobility of the canopy. When the canopy is moved or repositioned, and is in a position desired by the user, the wheel assemblies may be removed, placing the canopy back on the supporting surface.

Once replaced on the supporting surface there may be occasion of expected high winds, even a tornado or a hurricane, that could move or damage the canopy. To protect against such an occurrence, if it is neither desirable nor possible to move the framework inside a shelter, an anchoring system is provided to secure the canopy by its framework to the supporting surface.

Figure 19:
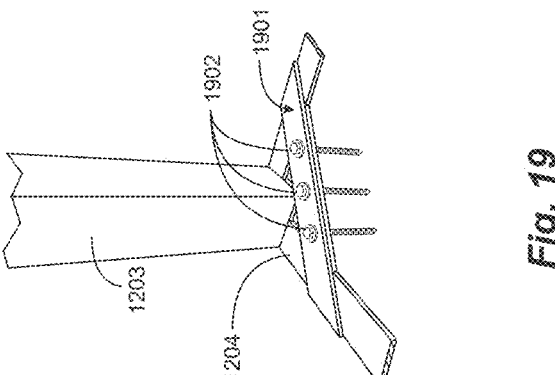
FIG. 19 illustrates an anchor system in an embodiment of the invention.

FIG. 19 illustrates one corner post 1203 of the MEGA version of the canopy in one embodiment. A cross brace 1901 is placed at an angle across between spans of base 1204. Some embodiments use angles between 10 and 80 degrees and preferably between 25 and 65 degrees. There are three through holes in the cross brace and anchor bolts 1902 are used to anchor the canopy to the supporting surface. One such cross brace with anchor bolts is used preferably at each corner post to very securely anchor the canopy to the surface.

In one embodiment, once the canopy is deployed on a driveway or other supporting surface, the anchoring cross braces are installed if not already in place. Locations for anchors in the supporting surface are marked through the three holes in each cross brace. The canopy is moved aside a short distance, and holes are drilled in the surface and anchors are installed to accept the anchor bolts. Once the anchors are installed the canopy may be positioned properly over the anchor points and the anchor bolts engaged to securely anchor the canopy to the supporting surface.

Figure 20:
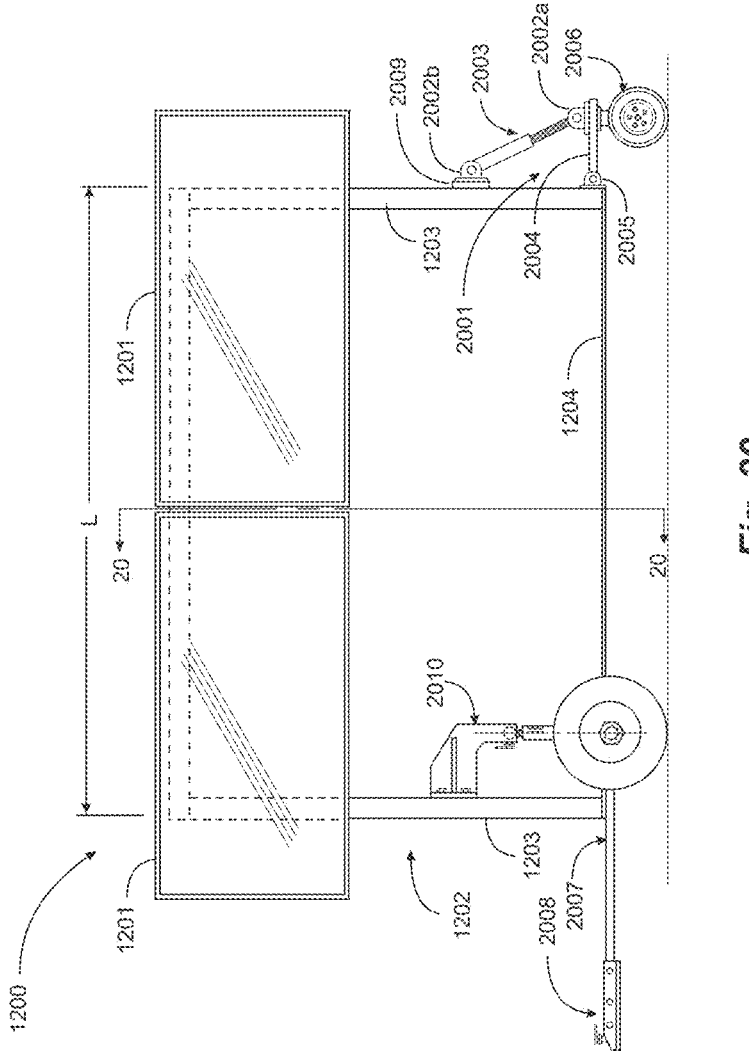
FIG. 20 is a side elevation view of a VEGA Canopy in an embodiment having a trailer dolly and rear wheels.

In another aspect of the invention a VEGA (vehicular) Canopy, more properly a Vehicular Electricity Generating Canopy Appliance, is provided that may be towed by an automobile or a truck for relocation. FIG. 20 is a side elevation view of such a VEGA Canopy 1200 showing a sturdy frame 1202 having corner posts 1203 as shown in FIG. 12, a rectangular flat base 1204, and solar panels 1201 folded downward for transit. A removeable, wheeled assembly 2001 on a rear portion of the canopy has a pivoted base 2004 with a first bearing pivot 2002*a* on the base and a second bearing pivot 2002*b* attached to corner post 1203. There is a combination spring/shock assembly 2003 attached between the two bearing pivots. A caster assembly 2006, which may be a commercially available assembly such as a Hamilton R-7210-PR assembly, which is a rigid unit, is attached below the base. There is no need in this version for a swivel caster assembly. Base 2004 is free to pivot vertically around a bearing pivot 2005, also attached to the corner post, against the spring and shock assembly. The assembly seen in this side view is one of at least two across the rear of the canopy, with a second assembly joined to the corner post beyond the corner post seen in FIG. 20.

In this example a trailer dolly 2007 is provided at a forward portion of the canopy to carry the forward portion in transit, and the trailer dolly has a commercial hitch 2008 compatible with standard hitch balls. A bracket assembly 2010 is fastened across the corner posts at the front of the canopy to mate with a vertically-extended ball of the trailer dolly 2007.

The skilled person will understand that the VEGA canopy appliance is made such that a car may pass under the structure with the solar panels in either direction, lengthwise or widthwise, with the solar panels deployed. Accordingly, it will be apparent that at least bracket assembly 2010 will need to be provided and assembled to the front corner posts of the canopy at the time that a user wishes to tow the canopy and removed to place the canopy again on a ground surface.

Figure 21:
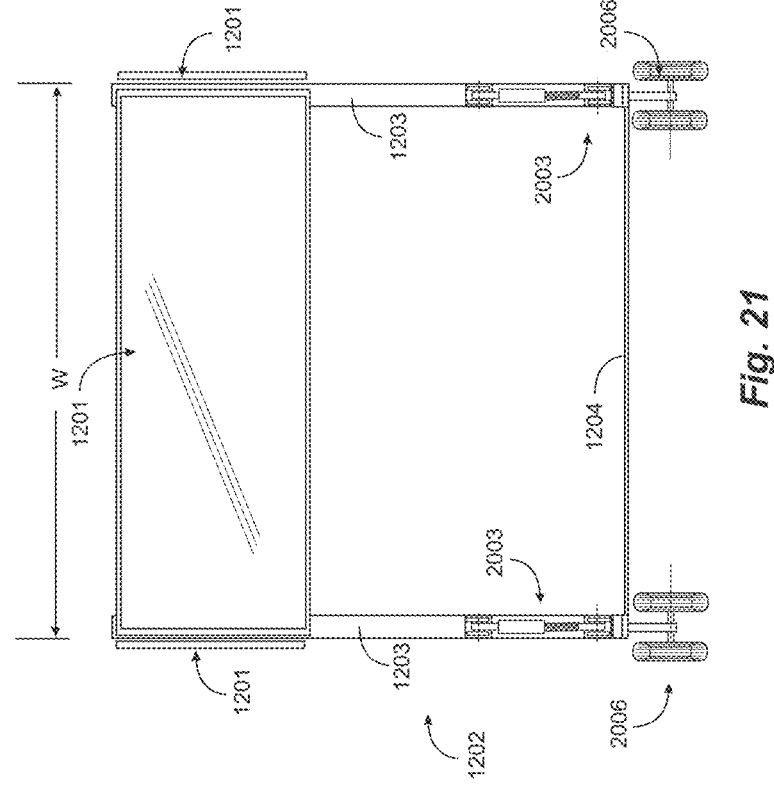
FIG. 21 is a rear elevation view of the VEGA canopy appliance of FIG. 20.

FIG. 21 is a rear elevation view of the canopy of FIG. 20 illustrating the two spring and shock units 2003 attached to the rear-facing surfaces of the rear two corner posts 1203. There are two combination spring/shock assemblies 2003 one on each side of the canopy. Each set of wheels with spring and shock absorber may operate independently. The two assemblies are relatively easy to add to a canopy and to remove if such is desired. Both may be retracted with the casters off the ground surface without occluding the width between the corner posts for a vehicle to pass.

Figure 22:
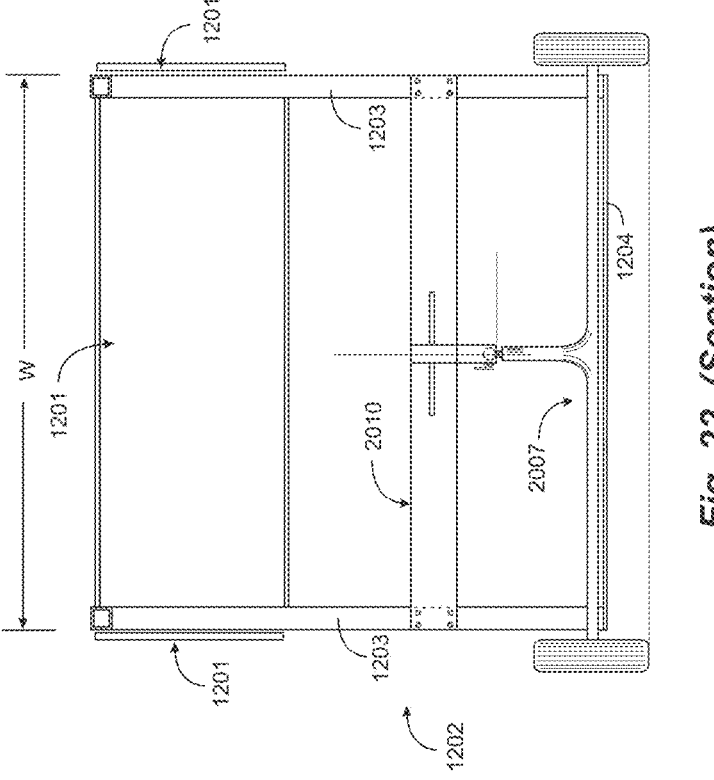
FIG. 22 is a center section view of the VEGA canopy appliance of FIG. 20.

FIG. 22 is a section view from the same viewpoint as FIG. 21, with the section line through a midpoint of the length of the canopy, to be able to illustrate the placement of trailer dolly 2007 in the embodiment shown in FIG. 20. Bracket assembly 2010 is shown bolted across the inside edges of the corner posts in front. Trailer dolly 2007 presents a ball for a hitch on the bracket assembly 2010. The front weight of the canopy in transit is carried by the trailer dolly connected to bracket assembly 2010.

Figure 23:
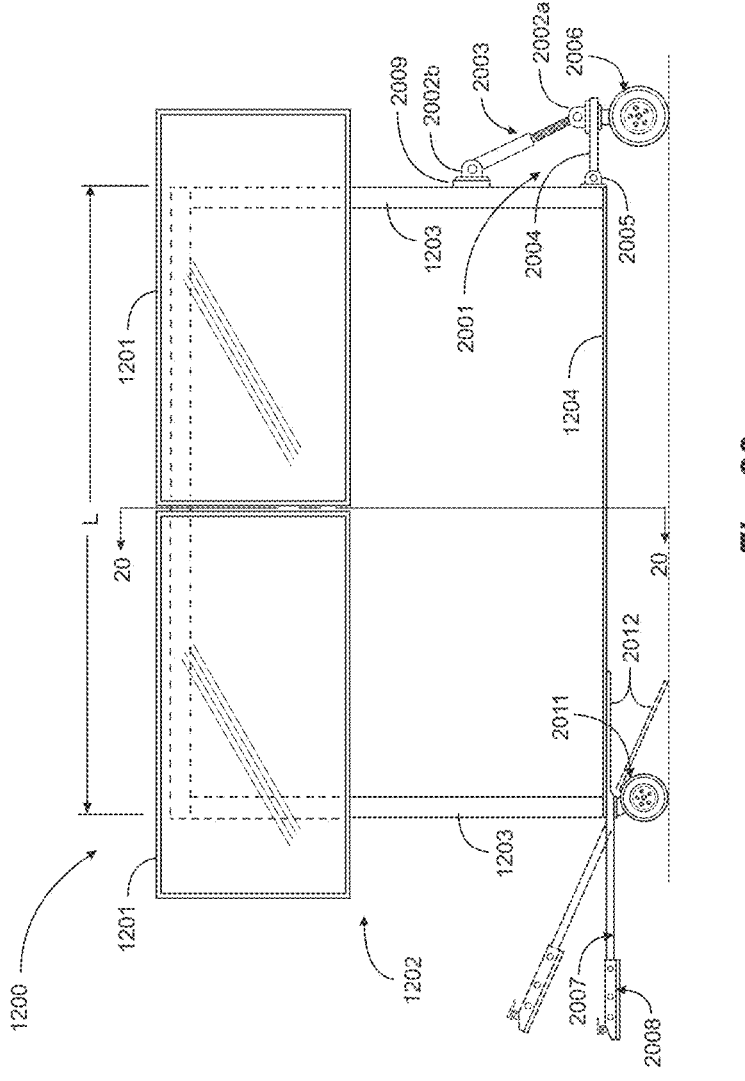
FIG. 23 is a side elevation view of a VEGA Canopy in an alternative embodiment.

FIG. 23 is a side elevation view of a VEGA canopy in yet another embodiment. In this embodiment the casters with shocks and springs attached to the rear corner posts are the same as in the version illustrated in FIG. 20 and FIG. 21. In this version the dolly has a plate of the width of the canopy, underlying both forward corner posts, and there are two swivel casters 2011, one fastened to the plate directly under each corner post. The swivel casters are of the trailing sort, with an angled post, The plate has a forward central extension to the ball hitch 2008 and a rearward extending portion 2012 of the width of the canopy, which, with the ball hitch raised as shown in FIG. 23 provides a loading ramp 2012 which may be positioned against ground surface by lifting the forward region of the dolly. The position of the ramp when tilted is shown in FIG. 23 in dotted outline. Once the frame is loaded up the ramp, which may be done in several ways, and the dolly is repositioned with the ramp level there may be fasteners (not shown) to attach the frame to the ramp and the dolly.

Figure 24:
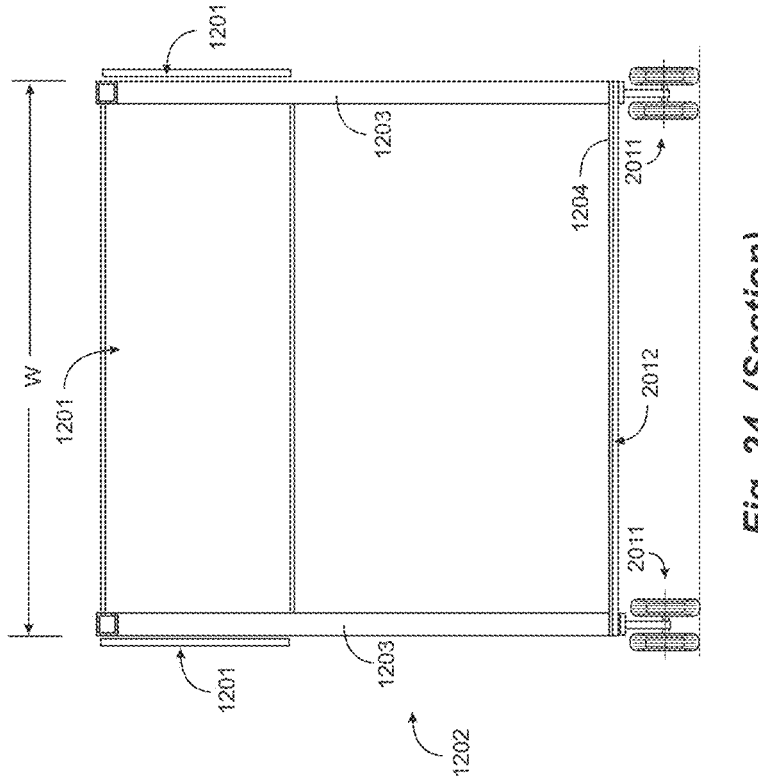
FIG. 24 is a center section view of the VEGA canopy appliance of FIG. 23.

FIG. 24 is a section view from the same viewpoint as in FIG. 22 showing plate 2012 underneath flat base 1204 of the canopy and the two swivel casters 2011, one directly beneath each forward corner post.

Figure 25:
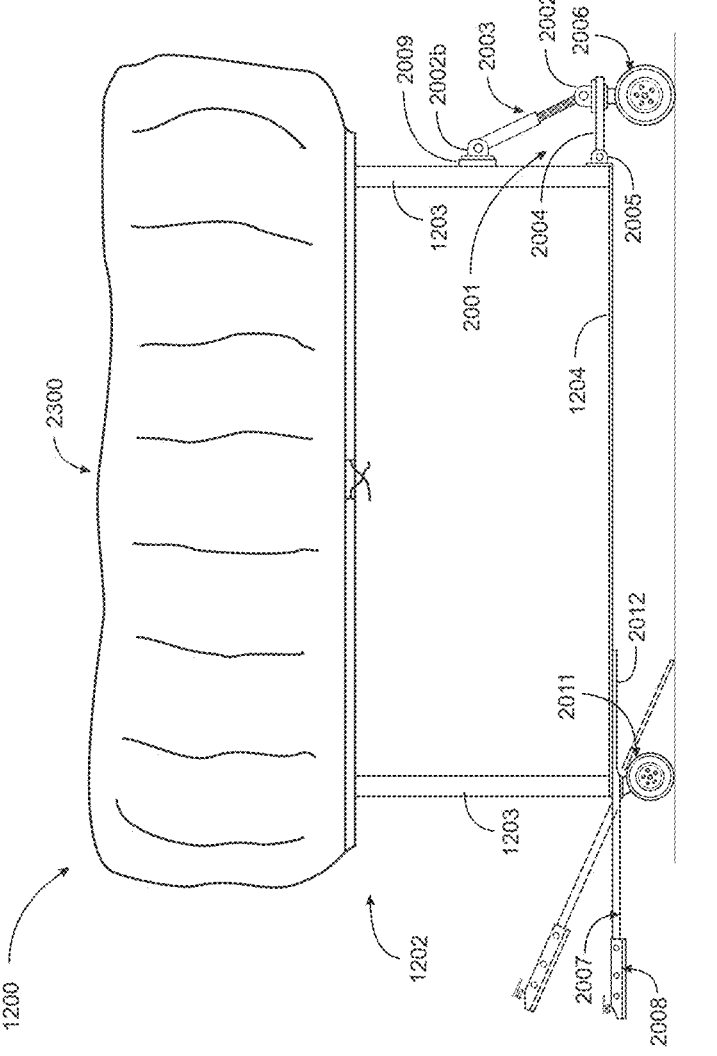
FIG. 25 is a side elevation view of the VEGA canopy appliance of FIG. 23 showing a travel cover.

FIG. 25 is a side elevation view like FIG. 20 with a canvas cover 2300 installed over the canopy for protection in transit and tied down. Cover 2300 in one embodiment is a cover with an inner and an outer layer with a filling to provide a cushioning effect for elements of the canopy in transit.

A person of ordinary skill will understand that the embodiments described above are each and all exemplary and are not limiting to the scope of the invention, which is limited only by the claims. There are a variety of ways that different features of the invention may be implemented other than the specific ways disclosed in the examples illustrated and described. For example, there are many materials that may be used for the framework other than aluminum tubing. Material suggestions provided herein are exemplary only and not intended to be limiting. Thus disclosed, it will be obvious to a person skilled in the art to select a suitable material. Many sorts of solar panels may be employed. The scope is limited only by the claims.

The invention claimed is:

1. A vehicular electricity generating canopy appliance, comprising:

a rectangular framework having a length (L), a width (W), and a height (H), with four corner posts and a rectangular top;

a flat, rectangular base plate having the length and width with the corner posts joined securely to the baseplate at four corners of the baseplate;

a plurality of solar panels mounted in a horizontal aspect on the top of the rectangular framework;

solar panels hinged along a long edge of each panel to a top edge of first and second long sides of the framework;

a solar panel hinged to a top edge of first and second short ends of the framework;

support apparatus hinged to the posts, adapted to support the hinged solar panels in a horizontal aspect when raised;

circuitry and wiring connecting the solar panels to a cable ending in a connector compatible with an inverter or an EV-Charger or both;

an auxiliary wheel assembly attached to each one of the two corner posts at one end of the framework, each with a wheel deployed away from the framework in a direction of the length, with the wheels supporting the framework above a ground surface;

a two-wheel trailer dolly having a frame with a vertically extended hitch ball at a midpoint between the two wheels, the two wheels separated by a dimension greater than the width of the rectangular framework, and an extension of the frame in a direction at a right angle to a common axis of the two wheels, ending in a first ball hitch socket; and a bracket assembly fastened across the corner posts at the end opposite the auxiliary wheel assemblies, the bracket assembly having a second ball hitch socket at a midpoint between the corner posts, such that the second ball hitch socket engages the vertically extended hitch ball of the trailer dolly, and with the trailer dolly joined by the first hitch ball socket to a hitch ball of a towing vehicle, the end of the canopy appliance opposite the auxiliary wheels is carried by the dolly, and the canopy appliance is towable by the towing vehicle.

2. The vehicular electricity generating canopy appliance of claim 1, wherein the rectangular base plate has two opposite long side regions, and two end regions.

3. The vehicular electricity generating canopy appliance of claim 1, wherein there is a minimum clearance above the base plate of six feet to the rectangular top, allowing vehicles, with the base plate on the ground surface, to drive over the baseplate edge and end regions and to park under the canopy.

4. The vehicular electricity generating canopy appliance of claim 1, wherein the solar panels are bifacial.

5. The vehicular electricity generating canopy appliance of claim 1, wherein the inverter is a combination inverter/charger with cables for charging electric vehicles, supporting optional Vehicle to Grid (V2G) operations.

6. The vehicular electricity generating canopy appliance of claim 5, wherein the inverter connects to house or business wiring, providing power to the building, grid, or electric vehicle batteries.

7. The vehicular electricity generating canopy appliance of claim 1, further comprising a fabric cover for protection.

8. The vehicular electricity generating canopy appliance of claim 1 wherein the wheels of the auxiliary wheel assemblies are attached to base elements pivoted to the corner posts, and the base elements are constrained in operation by springs and shock absorbers.

* * * * *